United States Patent
Kim et al.

(10) Patent No.: US 8,332,727 B2
(45) Date of Patent: Dec. 11, 2012

(54) ERROR CORRECTION CIRCUIT, FLASH MEMORY SYSTEM INCLUDING THE ERROR CORRECTION CIRCUIT, AND OPERATING METHOD OF THE ERROR CORRECTION CIRCUIT

(75) Inventors: Kwan-ho Kim, Hwasung-si (KR); Kyoung-mook Lim, Hwasung-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 563 days.

(21) Appl. No.: 12/556,822

(22) Filed: Sep. 10, 2009

(65) Prior Publication Data

US 2010/0070827 A1 Mar. 18, 2010

(30) Foreign Application Priority Data

Sep. 12, 2008 (KR) .................. 10-2008-0090491

(51) Int. Cl.
*G11C 29/00* (2006.01)
(52) U.S. Cl. ....................... 714/773; 714/763
(58) Field of Classification Search .......... 714/763–767, 714/773
See application file for complete search history.

(56) References Cited

U.S. PATENT DOCUMENTS

| | | | | |
|---|---|---|---|---|
| 5,812,564 A * | 9/1998 | Bonke et al. | | 714/769 |
| 6,986,097 B1 * | 1/2006 | Ireland et al. | | 714/801 |
| 7,113,968 B1 * | 9/2006 | Ireland et al. | | 708/492 |
| 7,263,649 B2 | 8/2007 | Gan et al. | | |
| 7,437,653 B2 * | 10/2008 | Gorobets | | 714/782 |
| 7,493,457 B2 * | 2/2009 | Murin | | 711/157 |
| 7,949,929 B2 * | 5/2011 | Liang et al. | | 714/769 |
| 2004/0255225 A1 * | 12/2004 | Takai | | 714/763 |
| 2007/0266297 A1 | 11/2007 | Liang et al. | | |

FOREIGN PATENT DOCUMENTS

KR 1020060054538 5/2006

* cited by examiner

*Primary Examiner* — Steve Nguyen
(74) *Attorney, Agent, or Firm* — F. Chau & Associates, LLC

(57) ABSTRACT

A flash memory system includes a memory unit including a main cell that stores main data and a parity cell that stores parity data, and an ECC receiving a codeword including the stored main data and the stored parity data, performing error correction on the codeword by executing an operation on a finite field with respect to the codeword, and an element of the finite field comprising a codeword corresponding to an erased page of the memory unit.

18 Claims, 5 Drawing Sheets

FIG. 3A

| + | △ | ▨ |
|---|---|---|
| △ | △ | ▨ |
| ▨ | ▨ | △ |

| x | △ | ▨ |
|---|---|---|
| △ | △ | △ |
| ▨ | △ | ▨ |

IDENTITY ELEMENT
  FOR ADDITION = △
△ INVERSE ELEMENT OF ···
  FOR ADDITION = △
▨ INVERSE ELEMENT OF ···
  FOR ADDITION = ▨

IDENTITY ELEMENT
  FOR MULTIPLICATION = ▨
▨ INVERSE ELEMENT OF ···
  FOR MULTIPLICATION = ▨

| + | 0 | 1 |
|---|---|---|
| 0 | 0 | 1 |
| 1 | 1 | 0 |

| x | 0 | 1 |
|---|---|---|
| 0 | 0 | 0 |
| 1 | 0 | 1 |

IDENTITY ELEMENT
  FOR ADDITION = 0
0 INVERSE ELEMENT OF ···
  FOR ADDITION = 0
1 INVERSE ELEMENT OF ···
  FOR ADDITION = 1

IDENTITY ELEMENT
  FOR MULTIPLICATION = 1
1 INVERSE ELEMENT OF ···
  FOR MULTIPLICATION = 1

| + | 1 | 0 |
|---|---|---|
| 1 | 1 | 0 |
| 0 | 0 | 1 |

IDENTITY ELEMENT
FOR ADDITION = 1

1 INVERSE ELEMENT OF ···
FOR ADDITION = 1

0 INVERSE ELEMENT OF ···
FOR ADDITION = 0

| × | 1 | 0 |
|---|---|---|
| 1 | 1 | 1 |
| 0 | 1 | 0 |

IDENTITY ELEMENT
FOR MULTIPLICATION = 0

0 INVERSE ELEMENT OF ···
FOR MULTIPLICATION = 0

GF($2^3$) ADDER

GF MULTIPLIER

ERROR CORRECTION CIRCUIT, FLASH MEMORY SYSTEM INCLUDING THE ERROR CORRECTION CIRCUIT, AND OPERATING METHOD OF THE ERROR CORRECTION CIRCUIT

CROSS-REFERENCE TO RELATED APPLICATIONS

This application claims priority to Korean Patent Application No. 10-2008-0090491, filed on Sep. 12, 2008, in the Korean Intellectual Property Office, the disclosure of which is incorporated by reference in its entirety herein.

BACKGROUND

1. Technical Field

The inventive concept relates to an error correction circuit, and more particularly, to an error correction circuit applied to a memory system and an operating method of the error correction circuit.

2. Discussion of Related Art

Demand for flash memories has increased with the development of mobile systems. A flash memory is an electrically erasable and programmable non-volatile memory device, which can maintain data without a power supply. A flash memory may also use less power than a magnetic disk memory and have an access time as fast as a hard disk.

For example, a flash memory can store information by changing a default state (e.g., logic "1") of a constituent cell to a used state (e.g., logic "0"). A collection of cells in a flash memory is referred to as a block. Before data can be written to a cell in the block, an erase operation resets all the cells in the block to have data "1". Each block of a flash memory may include a plurality of pages. A page in a block whose cells are all set to have data "1" is referred to as a free page.

An error may occur during a data read or write of a flash memory due to physical characteristics of the flash memory. An error correction circuit (ECC) may be included in a flash memory system to correct the error. The ECC circuit may include an ECC encoder and an ECC decoder. For example, when data is written to a flash memory, parity data generated by the ECC encoder is written together with main data. When data is read from the flash memory, the main data and the parity data are read together. The parity data is used by the ECC decoder to detect and correct errors in main data. The combination of the main data and the parity data is referred to as a codeword.

An application using flash memory may read data from a free page. However, data read from a free page (i.e., all data "1") does not correspond to a codeword used by the ECC circuit. As a result, the ECC circuit detects an error, but cannot correct the error.

Thus, there is a need for an error correction circuit that can handle data processing for a free page, a flash memory system including the error correction circuit, and a method of operating the error correction circuit.

SUMMARY

An exemplary embodiment of the inventive concept includes a flash memory system. The flash memory system includes a flash memory and an error correction circuit (ECC). The flash memory includes a plurality of flash memory cells. The cells include a main cell that stores main data and a parity cell that stores parity data. The error correction circuit (ECC) is configured to receive codewords comprising the stored main data and a corresponding one of the stored parity data and perform error correction on the codeword by executing an operation on a finite field corresponding to the codeword. An element of the finite field comprises a codeword from an erased page of the flash memory. The ECC includes an ECC decoder that performs error correction on the received codewords. The ECC decoder includes an error detection unit that includes at least one of an addition operator and a multiplication operator. The error detection unit detects errors in the received codewords. The addition operator executes an XNOR operation on the finite field. The multiplication operator executes at least one of an XNOR operation and an OR operation on the finite field.

The ECC decoder may further include an error correction unit and a free page detection unit. The error correction unit includes at least one of the addition operator and the multiplication operator and corrects the errors. The free page detection unit counts the number of bits having a value of "1" or the number of bits having a value of "0" among bits of the codewords and generates information indicating whether a corresponding page of the codeword in the flash memory is an erased page according to a result of comparing the count value to a threshold value.

The codeword corresponding to the erased page may serve as an identity element for addition in the operation on the finite field. All bits of the codeword corresponding to the erased page may have a value corresponding to "1". The addition operator may execute the XNOR operation so that the codeword corresponding to the erased page serves as an identity element for addition in the operation on the finite field.

The addition operator may include a first inverter inverting logic states of operands, an XOR operator executing an XOR operation on the operands passing through the first inverter, and a second inverter inverting an output of the XOR operator and outputting the inverted output.

The multiplication operator may include a third inverter inverting logic states of operands, an operation unit performing an XOR operation and an AND operation on operands passing through the third inverter, and a fourth inverter inverting an output of the operation unit and outputting the inverted output.

The free page detection unit may generate information indicating that the corresponding page is a free page if the number of bits having a value of "0" among bits of the codeword is less than or equal the threshold.

The ECC may further include an ECC encoder receiving main data provided from an external device and generating parity data based on a division operation using a predetermined polynomial, and the ECC encoder may include at least one register and at least one addition operator performing an addition operation on an output of the at least one register, in which the addition operator performs an XNOR operation. An initial value of the at least one register may be set to logic "1".

An exemplary embodiment of the inventive concept includes an error correction circuit (ECC). The ECC includes and ECC encoder and an ECC decoder. The ECC encoder is configured to receive main data provided from an external device and generate parity data based on a division operation using a predetermined polynomial. The ECC decoder is configured to receive codewords including the main data and the parity data, and perform error correction on the codewords by executing an operation on a finite field corresponding to the codewords. An element of the finite field includes one of the codewords where all bits of the codeword have a value corresponding to "1".

An exemplary embodiment of the inventive concept includes a method of operating an error correction circuit (ECC) included in a flash memory. The method recites including a first codeword corresponding to an erased page of the flash memory as an element of a finite field, receiving a second read codeword including main data and parity data, executing an operation on the finite field with respect to the second codeword, and performing error detection and correction on the second codeword based on a result of the execution.

BRIEF DESCRIPTION OF THE DRAWINGS

Exemplary embodiments of the inventive concept will be more clearly understood from the following detailed description taken in conjunction with the accompanying drawings in which:

FIGS. 3A and 3B are tables showing addition operations and multiplication operations on a general finite field;

FIG. 3C is a table showing an addition operation and a multiplication operation on a finite field according to an exemplary embodiment of the inventive concept;

DETAILED DESCRIPTION OF THE EMBODIMENTS

Figure 1:
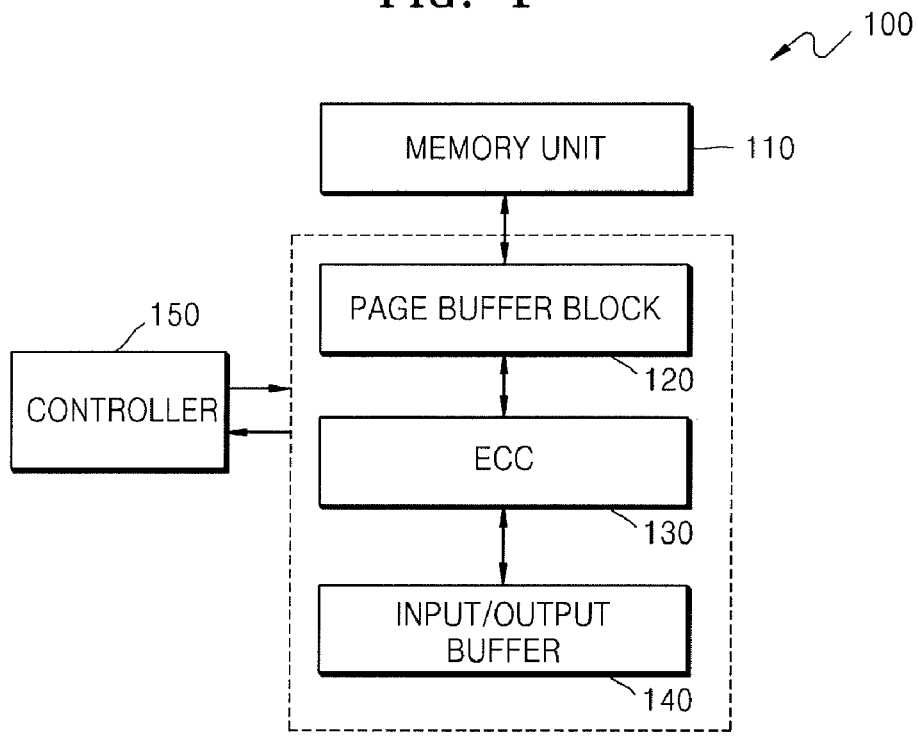
FIG. 1 is a block diagram illustrating a flash memory system according to an exemplary embodiment of the inventive concept.

Hereinafter, the inventive concept will be described in detail by describing exemplary embodiments of the inventive concept with reference to the accompanying drawings. Throughout the drawings, like reference numerals refer to like elements.

FIG. 1 is a block diagram illustrating a flash memory system 100 according to an exemplary embodiment of the inventive concept. Referring to FIG. 1, the flash memory system 100 (device) includes a memory unit 110, a page buffer block 120, an error correction circuit (ECC) 130, and an input/output (IO) buffer 140. The memory unit 110 includes a plurality of flash memory cells. The page buffer block 120, ECC 130, and IO buffer 140 may be used as peripheral circuits for performing write and read operations.

The ECC 130 generates parity data based on data input from an external device, or receives a codeword stored in the memory unit 110 and performs error detection and correction on the codeword. The flash memory system 100 may further include a controller 150 for controlling the peripheral circuits associated with the write and read operations with respect to the memory unit 110.

Although FIG. 1 illustrates the ECC 130 being included in a flash memory device, the scope of the inventive concept is not limited thereto. For example, the ECC 130 may be disposed external to the flash memory device.

The memory unit 110, which includes flash memory cells, may include a main cell (not shown) for storing main data and a parity cell (not shown) for storing parity data. The main cell and the parity cell are included in a page, which is a unit on which read operations are performed. A codeword including the main data and the parity data is read from the page.

When data is written to a flash memory, main data from an external device is stored in the IO buffer 140 and the main data stored in the IO buffer 140 is provided to the ECC 130. The ECC 130 generates parity data corresponding to the main data through an ECC encoding operation. The main data and the parity data corresponding to the main data are stored in the memory unit 110 through the page buffer block 120.

When data stored in a flash memory is read, a codeword stored in a predetermined page is read and the read codeword is provided to the ECC 130 through the page buffer block 120. The ECC 130 receives the read codeword and performs an operation on a finite field, thereby detecting an error in the codeword and correcting the detected error. A finite field is a field with a finite field order q (i.e., number of elements), also called a Galois field GF(q).

The error correction capability with respect to the main data corresponding to one page may vary according to characteristics of a method executed by the ECC 130 and the number of bits of the parity data. As a result of the error detection with respect to the codeword received by the ECC 130, if the error is within the number of bits that can be corrected, error correction is performed on the codeword. However, if error correction cannot be performed, a signal indicating that error correction cannot be performed is generated and output.

Prior to a write operation being performed on a block of a flash memory including a plurality of pages, an erase operation may be performed on the block. A page (e.g., including a main cell and a parity cell) included in an erased block has all data corresponding to "1" and a page in which all cells have the value corresponding to "1" is a free page.

A flash memory used in a memory system can report information indicating which page is a free page to an upper level application. An application using a flash memory may read data from a free page (e.g., a page having an erased-state). According to an exemplary embodiment of the inventive concept, the ECC 130 included in a memory system is used to detect whether a page is a free page, without the need to detect data included in all cells in the page via a separate circuit. In addition, the ECC 130 is configured to perform error detection and correction on a codeword having all data "1", which corresponds to an erased page.

Figure 2:
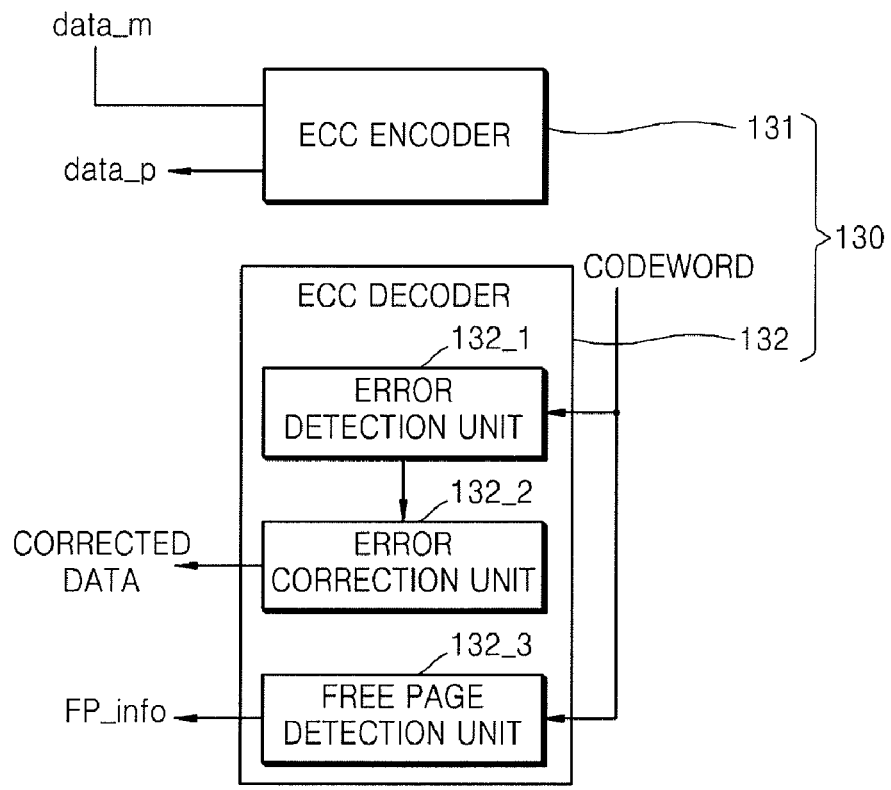
FIG. 2 is a block diagram illustrating an error correction circuit (ECC) of FIG. 1 according to an exemplary embodiment of the inventive concept.

FIG. 2 is a block diagram illustrating the ECC 130 of FIG. 1 according to an exemplary embodiment of the present invention. Referring to FIG. 2, the ECC 130 includes an ECC encoder 131 that receives predetermined main data data_m and generates parity data data_p corresponding to the main data data_m. The ECC 130 also includes an ECC decoder 132 that receives a codeword read from the memory unit 110, performs error detection and correction on the codeword to output error-corrected data, and detects whether a page corresponding to the received codeword is a free page to generate a detection result FP_info. The ECC decoder 132 may include an error detection unit 132_1, an error correction unit 132_2, and a free page detection unit 132_3. The ECC 130 may perform an operation on a finite field or a Galois field (GF). For example, the ECC 130 may perform the operation on GF ($2^n$) by nature of binary data. GF ($2^n$) is a number system including $2^n$ elements in which there exist identity and inverse elements for addition, and identity elements and inverse elements for multiplication. A codeword having all data "0" is an element on a finite field or a Galois field GF ($2^n$) and serves as an identity element for addition because all data "0" may serve as an identity element on GF ($2^n$). However, a codeword having all data "1" is not an element on GF ($2^n$). Thus if a codeword having all data "1" (e.g., a codeword read from a page having an erased state) is provided to the ECC 130, the ECC 130 reports that there is an error corresponding to the number of bits that cannot be corrected.

The ECC 130 performs an operation on a finite field (e.g., a GF) corresponding to a received codeword, thereby performing error detection and correction on the codeword. In an exemplary embodiment of the inventive concept, even when the received codeword has all data "1" corresponding to a page having an erased state, the codeword can be error-detected and corrected by the ECC 130. In the operation on the finite field performed by the ECC 130, a codeword having all data "1" is to be an element of the finite field. In addition, the codeword having all data "1" is to serve as an identity element for addition on the finite field.

Since a codeword read from a page having an erased state (i.e., a codeword having all data "1") is an element of the finite field used in the ECC 130, the ECC 130 can correct an error of a codeword read from a free page.

FIGS. 3A and 3B are tables showing addition operations and multiplication operations on a general finite field, and FIG. 3C is a table showing an addition operation and a multiplication operation on a finite field according to an exemplary embodiment of the inventive concept.

In FIG. 3A, definitions of addition and multiplication operations on GF (2) are expressed by symbols. According to a result of the addition operation on GF (2), a triangular symbol corresponds to an identity element for the addition operation. In this context, an identity element for addition on a GF extended field is a codeword in which all values have triangular symbols. According to the addition operation, the GF extended field has as one of its elements, the codeword in which all values have triangular symbols. According to a result of the multiplication operation on GF (2), a square symbol corresponds to an identity element for the multiplication operation.

In FIG. 3B, in the definitions of addition and multiplication operations, a triangular symbol is assigned as data "0" and a square symbol is assigned as data "1". As shown in FIG. 3B, data "0" corresponds to an identity element for the addition operation on GF(2). An inverse element of data "0" for the addition operation is data "0" and an inverse element of data "1" for the addition operation is "1". Data "1" corresponds to an identity element for the multiplication operation on GF(2), and an inverse element of data "1" for the multiplication operation is "1". According to such definitions of the operations, the addition operation on GF(2) is defined as an XOR operation with respect to operands and the multiplication operation on GF(2) is defined as an AND operation with respect to operands.

The codeword having all data "0" serves as an identity element for the addition operation on the GF extended field, and thus the GF extended field has the codeword having all data "0" as one of its elements.

FIG. 3C shows characteristics of operations performed by the ECC 130 according to an exemplary embodiment of the inventive concept. As shown in FIG. 3C, a data value corresponding to each symbol is set opposite to that in FIG. 3B. For example, a result of an addition operation with respect to data "1" and data "1" is "1", a result of the addition operation with respect to data "1" and data "0" is "0", and a result of the addition operation with respect to data "0" and data "0" is "1". Thus, an identity element for the addition operation performed by the ECC 130 has a value of "1" and the addition operation is defined as an XNOR operation. As shown in FIG. 3C, in the addition operation executed by the ECC 130, an inverse element of data "1" for the addition operation has a value of "1" and an inverse element of data "0" for the addition operation has a value of "0".

Since a data value corresponding to each symbol is set opposite to that in FIG. 3B in the operations defined as shown in FIG. 3C, an identity element for a multiplication operation executed by the ECC 130 has a value of "0". For example, as shown in FIG. 3C, a result of a multiplication operation with respect to data "1" and data "1" is "1", a result of the multiplication operation with respect to data "1" and data "0" is "1", and a result of the multiplication operation with respect to data "0" and data "0" is "0". In other words, the multiplication operation executed by the ECC 130 is defined as an OR operation.

As previously described, since data "1" serves as an identity element for an addition operation on a GF, the GF extended field has a codeword having all its data set to "1" as one of the elements. Thus, if a codeword having all data "1", which may be read from a free page, is provided to the ECC 130, the ECC 130 detects an error from the codeword and corrects the error occurring in the codeword, if the error is within a range of the error correction capability.

The free page detection unit 132_3 included in the ECC 130 receives a codeword provided to the ECC decoder 132 and counts the number of bits having a value of "1" or the number of bits having a value of "0" among bits included in the received codeword. A threshold corresponding to a predetermined integer may be set in the ECC decoder 132 or the threshold may be set in and provided from an external device. The free page detection unit 132_3 detects whether a page corresponding to the received codeword is a free page by comparing the count value to the threshold. For example, for a threshold that is set to 1, if the number of bits having data "0" among the bits included in the received codeword is less than or equal to 1, the free page detection unit 132_3 generates and outputs a signal FP_info indicating that the page corresponding to the codeword is a free page.

The ECC decoder 132 of the ECC 130 performs the above-described addition and multiplication operations for error detection and correction of a received codeword. Examples of an addition operator and a multiplication operator included in the ECC decoder 132 will be described below.

Figure 4A:
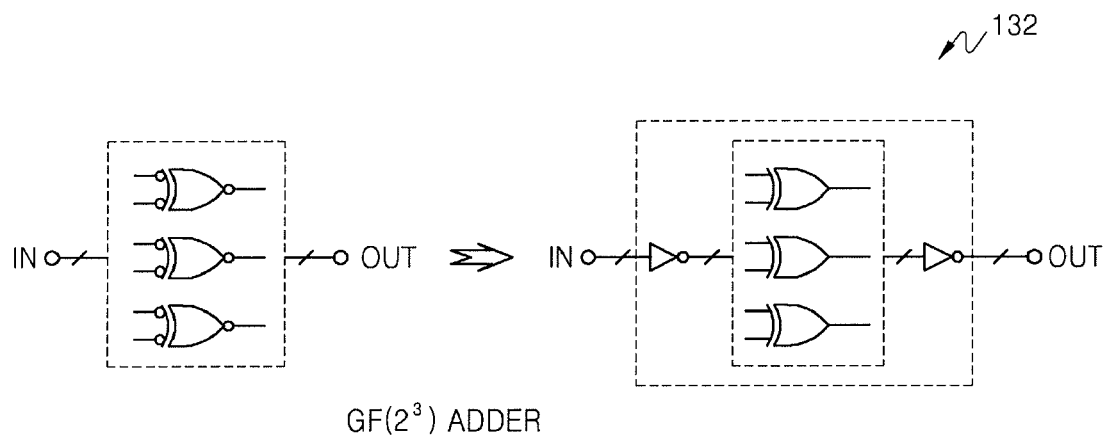
FIG. 4A is a circuit diagram illustrating an addition operator included in an ECC decoder of FIG. 2 according to an exemplary embodiment of the inventive concept.

FIG. 4A is a circuit diagram illustrating an addition operator included in the ECC decoder 132 of FIG. 2 according to an exemplary embodiment of the inventive concept. As mentioned above, the addition operation executed by the ECC 130 according to an exemplary embodiment of the inventive concept is defined as an XNOR operation. In FIG. 4A, execution of an addition operation on GF($2^3$) is shown by way of an example.

As shown in FIG. 4A, 3-bit data items are provided to XNOR operators arranged in parallel and output results of XNOR operations are generated. By disposing a first common inverter at input terminals of XOR operators arranged in parallel and a second common inverter at output terminals of the XOR operators like in a circuit structure shown in FIG. 4A, the same operation result can be obtained. For example, according to an exemplary embodiment of the inventive concept, a general addition operator is disposed in the ECC decoder 132 and an inverter is disposed at each of an input terminal and an output terminal of the addition operator, thereby implementing an addition operator that executes an XNOR operation.

A multiplication operation on a GF, unlike the addition operation, may include various different logic circuits according to a primitive polynomial. For example, a multiplication operator on a GF may be implemented by a complex circuit that executes a number of multiplication and addition operations. A multiplication operator on a GF according to an exemplary embodiment of the inventive concept executes multiplication on each digit through an OR operation without a change in a selected primitive polynomial and executes addition on the digits through an XNOR operation.

Figure 4B:
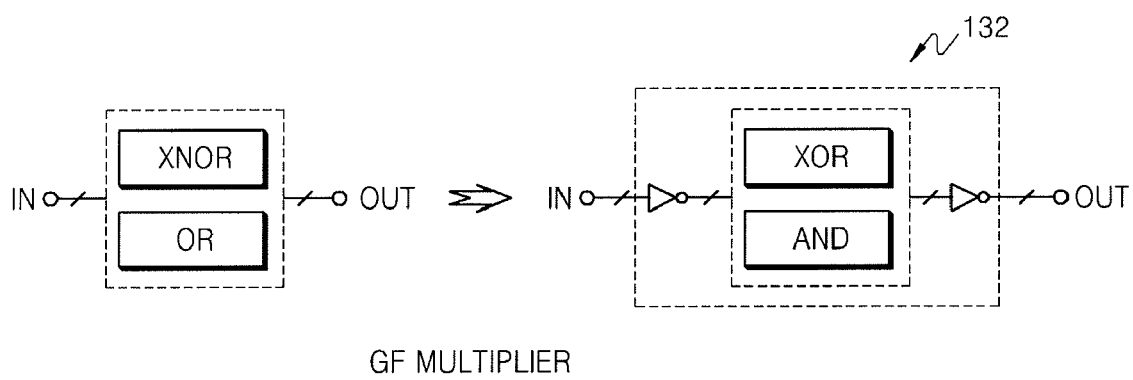
FIG. 4B is a circuit diagram illustrating a multiplication operator included in an ECC encoder illustrated of FIG. 2 according to an exemplary embodiment of the inventive concept.

As shown in FIG. 4B, a multiplication operator according to an exemplary embodiment of the inventive concept may be implemented by disposing a general multiplication operator including an AND operator for a general multiplication operation and an XOR operator for a general addition operation, a third common inverter at an input terminal of the general multiplication operator, and a fourth common inverter at an output terminal of the general multiplication operator. For example, by disposing common inverters at the input terminal and the output terminal, a multiplication operator that executes a multiplication operation based on an OR operation and an addition operation based on an XNOR operation can be implemented.

A combination of the addition operator and the multiplication operator included in the ECC decoder 132 may be made in various forms. If a logic circuit for performing an operation is implemented by a combinational logic circuit in the ECC decoder 132, the logic circuit of the ECC decoder 132 may be implemented by a serial combination of addition operators and multiplication operators. In this example, it is not necessary to dispose an inverter at an input terminal and an output terminal of each operator. For example, inverters disposed between connections of operators can be removed, and an inverter disposed at an input terminal of the first operator and an inverter disposed at an output terminal of the last operator are added, thereby implementing the logic circuit of the ECC decoder 132 according to an exemplary embodiment of the inventive concept.

Such an implementation method assumes that logic in the ECC decoder 132 is implemented by a combinational logic circuit. However, a division operator implemented by a sequential logic circuit cannot complete a calculation within one cycle because the sequential logic circuit typically includes at least one register.

Figure 5:
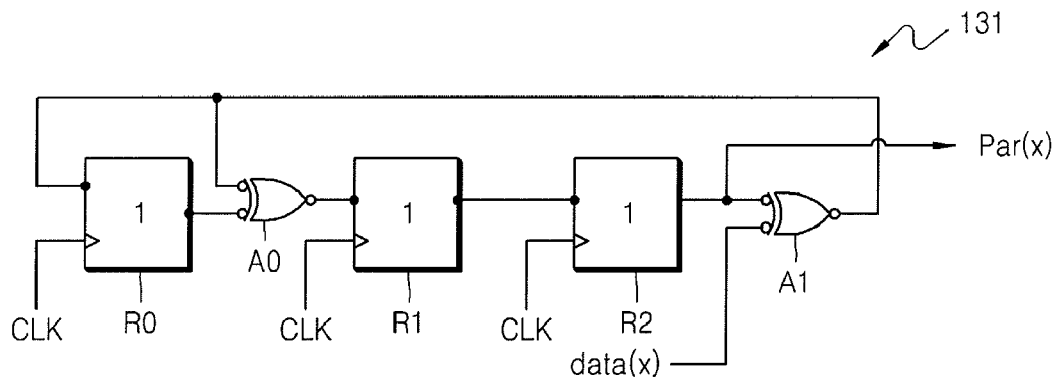
FIG. 5 is a circuit diagram illustrating a division operator included in the ECC encoder of FIG. 2 according to an exemplary embodiment of the inventive concept.

FIG. 5 is a circuit diagram of a division operator included in the ECC encoder 131 of FIG. 2 according to an exemplary embodiment of the present invention. In FIG. 5, as an example implementation of the ECC encoder 131, a Bose Chaudhuri Hocquenghem (BCH) encoder implemented by a one division operator is shown. The ECC encoder 131 receives data data(x) provided from an external device and generates parity data Par(x) based on a division operation using a predetermined polynomial. In FIG. 5, it is assumed that the predetermined polynomial is $x^3+x+1$, and the BCH encoder includes at least one sequentially connected register, e.g., first through third registers R0, R1, and R2, and at least one addition, e.g., operators A0 and A1, that perform addition operations based on an output of the at least one register. However, the ECC encoder 131 shown in FIG. 5 is merely an example, as the ECC encoder 131 can be implemented in various forms.

The first through third registers R0, R1, and R2 shown in FIG. 5 have initial values that are set to "1" rather than "0". An output of the first register R0 and an output of the second operator A1 are fed to the first addition operator A0 so that the first addition operator A0 performs an addition operation thereon and provides a result of the addition operation to an input terminal of the second register R1. As described above, in an embodiment of the inventive concept, the addition operation is defined as an XNOR operation. The second addition operator A1 receives an output of the third register R2 and data data(x) from an external device to perform an addition operation defined as an XNOR operation on the data data(x). The output of the second addition operator A1 is fed back to an input terminal of the first register R0. A value stored in each register through the above-described process is sequentially output as parity data Par(x).

In an operation on a finite field, executed by the ECC 130, symbols corresponding to "0" and "1" are assigned opposite to general cases to cause a codeword having all data "1" read from a free page to be an identity element of the finite field, such that error detection and correction with respect to data of the free page become possible, and the number of bits having a value of "0" or the number of bits having a value of "1" among bits of the codeword is counted to generate a signal indicating that a corresponding page is a free page.

Figure 6:
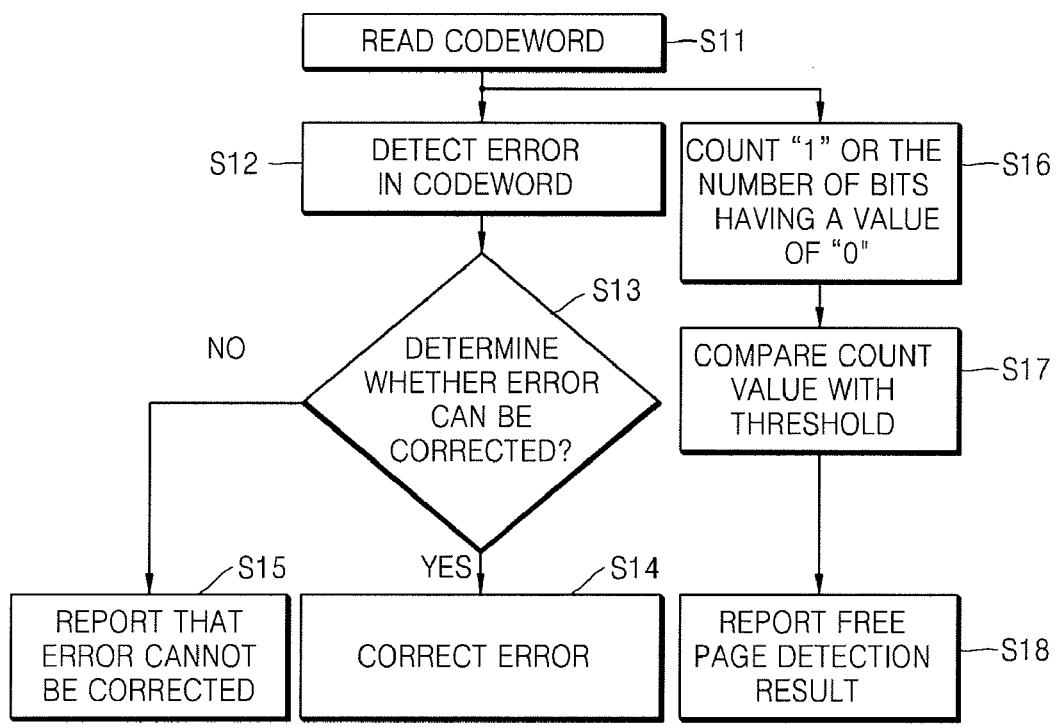
FIG. 6 is a flowchart illustrating a method of operating an ECC according to an exemplary embodiment of the inventive concept.

FIG. 6 is a flowchart illustrating a method of operating an ECC according to an exemplary embodiment of the inventive concept. The ECC may be included in a flash memory system to generate parity data from data written in a flash memory and perform error detection and correction on a codeword read from the flash memory.

Main data and parity data corresponding thereto are written to a flash memory. Referring to FIG. 6, the ECC reads a codeword including the main data and the parity data in response to a read command in operation S11. An operation of generating and writing the parity data is similar to the ECC encoding disclosed above and thus will not be described in detail.

The ECC included in the flash memory system receives a codeword and performs error detection and correction on the received codeword. The ECC also detects whether a page corresponding to the received codeword is a free page by counting the number of bits having a value of "0" or the number of bits having a value of "1" among bits of the received codeword. These error detection and correction and free page detection operations may be performed sequentially or simultaneously.

Once the codeword is provided to the ECC, the ECC performs the error detection and correction operation on the codeword by executing an operation on a finite field. Thus, the ECC detects an error in the codeword in operation S12 and then determines whether the error can be corrected based on a result of the error detection in operation S13. If the ECC determines that the error can be corrected, it corrects the error occurring in the codeword in operation S14. However, if the ECC determines that the error cannot be corrected, it reports that the error in the codeword cannot be corrected in operation S15.

In the operations, a codeword read from a free page (i.e., a codeword having all data "1"), may be provided to the ECC and the codeword corresponding to the free page is to be an element of the finite field in an operation on the finite field executed by the ECC. The codeword having all data "1" serves as an identity element of an addition operation on the finite field for the codeword corresponding to the free page to be an element of the finite field. As discussed previously, by defining the addition operation on the finite field as an XNOR operation, the codeword having all data "1" may become an identity element of the addition operation.

As the codeword read from the free page is provided to the ECC and becomes an element of the finite field on which the ECC is based, the error detection and correction operation with respect to the codeword is performed normally. As a result, even when an error occurs in some bits of the codeword read from the free page, the ECC corrects the error within the range of the error correction capability and outputs the error-corrected codeword.

The ECC counts the number of bits having a value of "1" or the number of bits having a value of "0" among bits of the provided codeword in operation S16. For example, the number of bits having a value of "0" among bits of the codeword is counted. The count result is compared to a predetermined threshold in operation S17. The ECC detects whether the page corresponding to the codeword is a free page based on a result of the comparison. If the threshold is set to "1" and the number of bits having a value of "0" among bits of the codeword is less than or equal to 1, the page corresponding to the codeword is detected to be a free page and such a result of the detection is reported in operation S18. However, if the number of bits having a value of "0" among bits of the codeword is greater than or equal to 2, the page corresponding to the codeword is detected not to be a free page. Such a result of the detection may also be reported.

A flash memory including the above described ECC used in a memory system can report information indicating which page is a free page to an upper level application. For example, such a report can provide information indicating that data can be normally written to a corresponding page, and the report can be used to increase operation speed when data written over a plurality of blocks is copied to a new block.

While the inventive concept has been particularly shown and described with reference to exemplary embodiments thereof it will be understood by those of ordinary skill in the art that various modifications and equivalent other embodiments can be made from the inventive concept without departing from the spirit and scope of the disclosure.

What is claimed is:

1. A flash memory system comprising:
   a flash memory comprising a plurality of flash memory cells, the cells comprising a main cell that stores main data and a parity cell that stores parity data;
   an error correction circuit (ECC) configured to receive codewords comprising the stored main data and a corresponding one of the stored parity data and perform error correction on a received codeword by executing an operation on a finite field corresponding to the codeword, wherein an element of the finite field comprises a codeword from an erased page of the flash memory,
   wherein the ECC comprises an ECC decoder that performs error correction on the received codewords, and the ECC decoder comprises:
   an error detection unit that includes at least one of an addition operator and a multiplication operator and detects errors in the received codewords, the addition operator executes an XNOR operation on the finite field and the multiplication operator executes at least one of an XNOR operation and an OR operation on the finite field,
   wherein the codeword from the erased page of the flash memory serves as an identity element for addition in the operation on the finite field, and
   wherein all bits of the codeword from the erased page have a value corresponding to "1",
   wherein the multiplication operator comprises:
   a first inverter inverting logic states of operands;
   an operation unit performing an XOR operation and an AND operation on operands passing through the first inverter; and
   a second inverter inverting output of the operation unit and outputting the inverted output.

2. The flash memory system of claim 1, wherein the ECC decoder further comprises:
   an error correction unit that includes at least one of the addition operator and the multiplication operator and corrects the errors; and
   a free page detection unit that counts the number of bits having a value of "1" or the number of bits having a value of "0" among bits of the codewords and generates information indicating whether a corresponding page of the codeword in the flash memory is an erased page according to a result of comparing the count value to a threshold value.

3. The flash memory system of claim 2, wherein the free page detection unit generates information indicating that the corresponding page is a free page if the number of bits having a value of "0" among bits of the codeword is less than or equal to the threshold value.

4. The flash memory system of claim 1, wherein the addition operator comprises:
   a third inverter inverting logic states of operands;
   an XOR operator executing an XOR operation on the operands passing through the third inverter; and
   a fourth inverter inverting an output of the XOR operator and outputting the inverted output.

5. The flash memory system of claim 1, wherein the ECC further comprises an ECC encoder configured to receive main data provided from an external device and generate parity data based on a division operation using a predetermined polynomial.

6. The flash memory system of claim 1, wherein the ECC further comprises an ECC encoder that comprises at least one register and at least one addition operator to perform an addition operation on an output of the at least one register, in which the addition operator performs an XNOR operation.

7. The flash memory system of claim 6, wherein an output of a last one of the least one addition operators is fed back to an input of a first one of the at least one registers.

8. The flash memory system of claim 6, wherein an initial value of the at least one register is set to logic "1".

9. An error correction circuit (ECC) comprising:
   an ECC encoder configured to receive main data provided from an external device and generate parity data based on a division operation using a predetermined polynomial; and
   an ECC decoder configured to receive codewords comprising the main data and the parity data, and perform error correction on the codewords by executing an operation on a finite field corresponding to the codewords,
   wherein an element of the finite field includes a first codeword of the codewords that serves as an identity element for addition in the operation on the finite field, and
   wherein all bits of the first codeword have a value corresponding to "1",
   wherein the ECC further comprises an ECC encoder that comprises at least one register and at least one addition operator to perform an addition operation on an output of the at least one register, in which the addition operator performs an XNOR operation, and
   wherein an initial value of the at least one register is set to logic "1".

10. The ECC of claim 9, wherein each of the ECC encoder and the ECC decoder comprises at least one of an addition operator and a multiplication operator, and the addition operator executes an XNOR operation on the finite field and the multiplication operator executes at least one of an OR operation and an XNOR operation.

11. The ECC of claim 9, wherein the ECC decoder comprises:
an error detection unit configured to detect an error of the received codeword; and
an error correction unit configured to correct the error of the codeword based on a result of the detection, wherein if an error is detected by the error detection unit in the first codeword whose bits are all "1", the error of the first codeword is corrected by the error correction unit and output.

12. The ECC of claim 11, wherein the ECC decoder further comprises a free page detection unit configured to count the number of bits having a value of "1" or the number of bits having a value of "0" among bits of the received codeword and generate information indicating whether a corresponding page is a free page according to a result of comparing the count value to a threshold value.

13. A method of operating an error correction circuit (ECC) included in a flash memory, the method comprising:
including a first codeword corresponding to an erased page of the flash memory as an element of a finite field within the ECC;
receiving by the ECC, a read second codeword comprising main data and parity data;
executing by the ECC, an operation on the finite field with respect to the second codeword; and
performing by the ECC, error detection and correction on the second codeword based on a result of the execution,
wherein the first codeword serves as an identity element for addition in the operation on the finite field, and
wherein all bits of the first codeword have a value corresponding to "1",
wherein during the executing operation, the ECC performs a multiplication on the finite field by:
using a first inverter to invert logic states of operands;
using an operation unit to perform an XOR operation and an AND operation on operands passing through the first inverter; and
using a second inverter to invert an output of the operation unit and outputting the inverted output.

14. The method of claim 13, wherein the second codeword corresponds to an erased page of the flash memory.

15. The method of claim 13, wherein the executing of the operation comprises performing at least one of an addition operation and a multiplication operation on the finite field, in which the addition operation is performed by an XNOR operation and the multiplication operation is performed by at least one of an XNOR operation and an OR operation.

16. The method of claim 13, further comprising:
counting the number of bits having a value of "1" or the number of bits having a value of "0" among bits of the second codeword;
comparing the count value to a threshold value; and
generating information indicating whether a page corresponding to the second codeword is a free page based on a result of the comparison.

17. The method of claim 13, wherein performing error detection and correction comprises:
determining whether the second codeword has an error;
determining whether the error can be corrected; and
reporting the error if the error can be corrected and reporting the error cannot be corrected otherwise.

18. A flash memory system comprising:
a flash memory comprising a plurality of flash memory cells, the cells comprising a main cell that stores main data and a parity cell that stores parity data;
an error correction circuit (ECC) configured to receive codewords comprising the stored main data and a corresponding one of the stored parity data and perform error correction on a received codeword by executing an operation on a finite field corresponding to the codeword, wherein an element of the finite field comprises a codeword from an erased page of the flash memory,
wherein the ECC comprises an ECC decoder that performs error correaction on the received codewords, and the ECC decoder comprises:
an error detection unit that includes at least one of an addition operator and a multiplication operator and detects errors in the received codewords, the addition operator executes an XNOR operation on the finite field and the multiplication operator executes at least one of an XNOR operation and an OR operation on the finite field,
wherein the ECC further comprises an ECC encoder that comprises at least one register and at least one addition operator to perform an addition operation on an output of the at least one register, in which the addition operator performs an XNOR operation, and
wherein an initial value of the at least one register is set to logic "1".

* * * * *